(12) United States Patent
Kanda et al.

(10) Patent No.: US 8,948,479 B2
(45) Date of Patent: Feb. 3, 2015

(54) IMAGE PROCESSING DEVICE, IMAGE PROCESSING METHOD AND COMPUTER READABLE RECORDING DEVICE

(75) Inventors: Yamato Kanda, Hino (JP); Makoto Kitamura, Hachioji (JP); Takehiro Matsuda, Hachioji (JP); Takashi Kono, Tachikawa (JP); Masashi Hirota, Hachioji (JP)

(73) Assignee: Olympus Corporation, Tokyo (JP)

( * ) Notice: Subject to any disclaimer, the term of this patent is extended or adjusted under 35 U.S.C. 154(b) by 189 days.

(21) Appl. No.: 13/599,429

(22) Filed: Aug. 30, 2012

(65) Prior Publication Data

US 2013/0051642 A1 Feb. 28, 2013

(30) Foreign Application Priority Data

Aug. 31, 2011 (JP) ................................ 2011-190073

(51) Int. Cl.
*G06K 9/46* (2006.01)
*G06T 7/00* (2006.01)
*G06T 7/40* (2006.01)

(52) U.S. Cl.
CPC ............. *G06T 7/408* (2013.01); *G06T 7/0012* (2013.01); *G06T 2207/10068* (2013.01); *G06T 2207/30028* (2013.01)
USPC ......................................... 382/128; 382/165

(58) Field of Classification Search
None
See application file for complete search history.

(56) References Cited

U.S. PATENT DOCUMENTS

| 5,793,380 | A | * | 8/1998 | Matsuno ....................... 345/443 |
| 5,984,870 | A | * | 11/1999 | Giger et al. ................... 600/443 |
| 2002/0177779 | A1 | | 11/2002 | Adler et al. |
| 2010/0098306 | A1 | * | 4/2010 | Madabhushi et al. ........ 382/128 |
| 2010/0312072 | A1 | * | 12/2010 | Breskin et al. ................ 600/300 |

FOREIGN PATENT DOCUMENTS

JP 2008-093172 4/2008

OTHER PUBLICATIONS

Wang, H., et al.,"An Effective Approach to Detect Lesions in Color Retinal Images" Proceedings 2000 IEEE Conference on Computer Vision and Pattern Recognition. CVPR 2000, Jun. 13, 2000, pp. 181-186.

Orozco-Alzate, M., et al.,"A Generalization of Dissimilarity Representations Using Feature Lines and Feature Planes", Pattern Recognition Letters, vol. 30, No. 3, Feb. 1, 2009, pp. 242-254.

Omer, I, et al.,"Color Lines: Image Specific Color Representation", Proceedings of the 2004 IEEE Computer Society Conference on Computer Vision and Pattern Recognition, vol. 2, Jun. 27, 2004, pp. 946-953.

(Continued)

*Primary Examiner* — Jon Chang
(74) *Attorney, Agent, or Firm* — Scully, Scott, Murphy & Presser, PC

(57) ABSTRACT

An image processing device includes: a feature data calculator configured to calculate the feature data of each pixel in an image; an approximate shape calculator configured to calculate an approximate shape approximating a profile of a distribution area in which the feature data is distributed in a feature space having the feature data as an element; and an abnormal area detector configured to detect an abnormal area in the image based on the approximate shape and the profile of the distribution area.

16 Claims, 16 Drawing Sheets

(56) References Cited

OTHER PUBLICATIONS

Lichtenauer, J., et al.,"A Calibrationless Skin Color Model", Oct. 2, 2008, pp. 1-7, Retrieved from the Internet: URL: http://web.archive.org/web/20081002143344/http://ict.ewi.tudelft.nl/pub/marcel/lich06d.pdf, retrieved on Jan. 14, 2013.

Zhang, J., et al.,"Nearest Manifold Approach for Face Recognition", Automatic Face and Gesture Recognition, 2004, Proceedings of the Sixth IEEE International Conference on Automatic Face and Gesture Recognition, May 17, 2004, pp. 223-228.

Kakumanu, P., et al.,"A Survey of Skin-Color Modeling and Detection Methods", Pattern Recognition, Nov. 6, 2006, vol. 40, No. 3, pp. 1106-1122.

\* cited by examiner

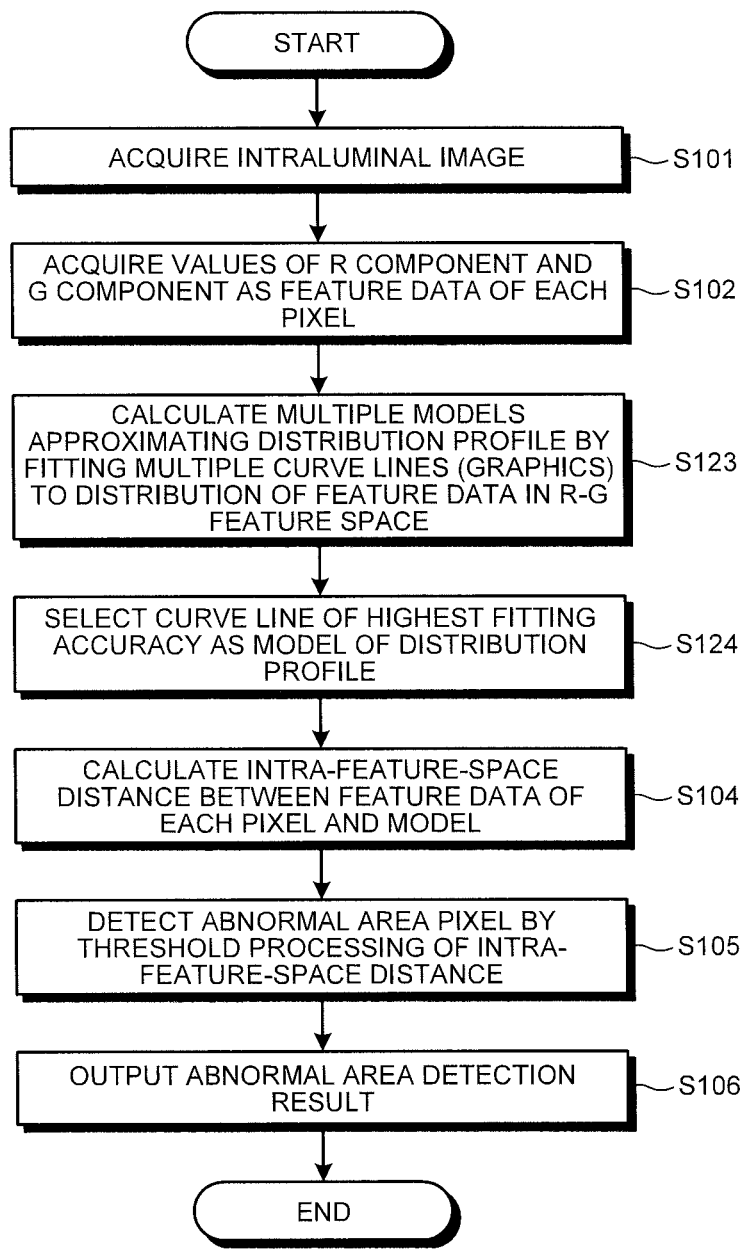

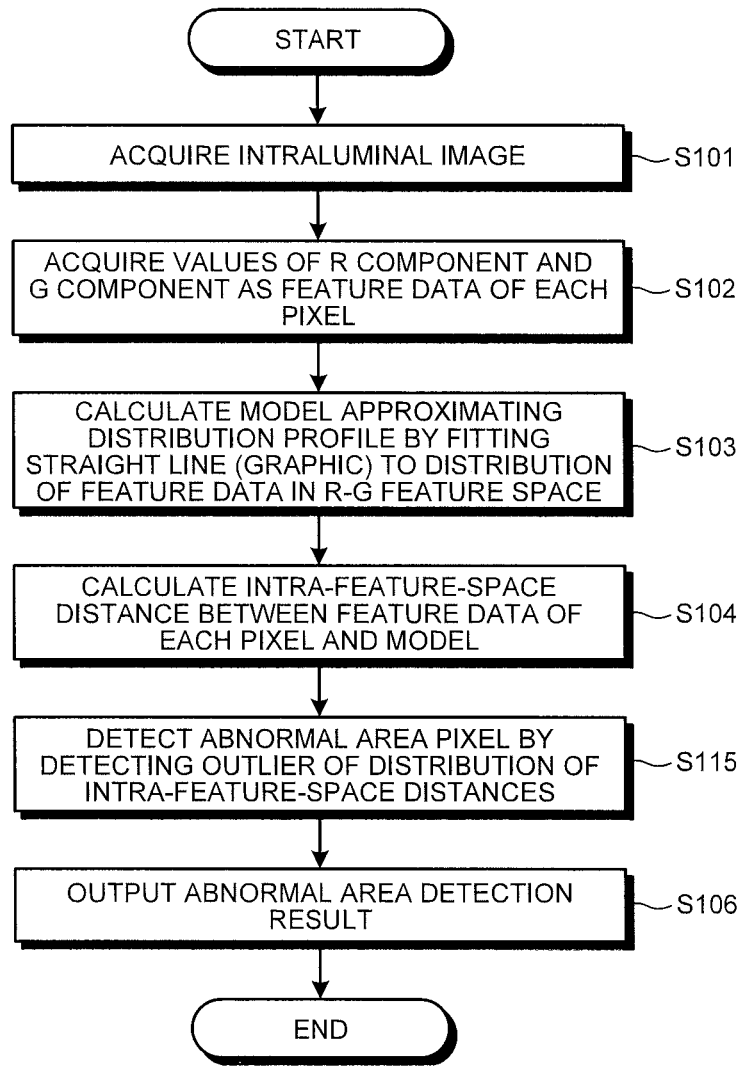

IMAGE PROCESSING DEVICE, IMAGE PROCESSING METHOD AND COMPUTER READABLE RECORDING DEVICE

CROSS-REFERENCE TO RELATED APPLICATIONS

This application is based upon and claims the benefit of priority from Japanese Patent Application No. 2011-190073, filed on Aug. 31, 2011, the entire contents of which are incorporated herein by reference.

BACKGROUND OF THE INVENTION

1. Field of the Invention

The present invention relates to an image processing device, an image processing method and a computer readable recording device to detect a specific area from an image.

2. Description of the Related Art

As a technique of detecting a specific area from an image, for example, Japanese Laid-open Patent Publication No. 2008-93172 discloses a configuration of an image processing device that detects an abnormal area (or lesion candidate area) from an in-vivo image (or intraluminal image) captured inside a living body, based on image value variation between an interest pixel and multiple surrounding pixels positioned around the interest pixel. To be more specific, Japanese Laid-open Patent Publication No. 2008-93172 discloses: calculating a difference value between a pixel value of an interest pixel and an average pixel value of surrounding pixels, which are separated by predetermined distance from the interest pixel in each direction (e.g. vertical direction, horizontal direction or diagonal direction) determined in advance with respect to the interest pixel and which are oppositely set; and, based on this difference value, detecting an area, in which a predetermined pixel value change is caused compared to the surroundings, as an abnormal area.

SUMMARY OF THE INVENTION

An image processing device according to an aspect of the present invention includes: a feature data calculator configured to calculate feature data of each pixel in an image or each area acquired by dividing the image into a plurality of areas; an approximate shape calculator configured to calculate an approximate shape approximating a profile of a distribution area in which the feature data is distributed in a feature space having the feature data as an element; and an abnormal area detector configured to detect an abnormal area in the image based on the approximate shape and the profile of the distribution area.

An image processing method according to another aspect of the present invention includes: calculating feature data of each pixel in an image or each area acquired by dividing the image into a plurality of areas; calculating an approximate shape approximating a profile of a distribution area in which the feature data is distributed in a feature space having the feature data as an element; and detecting an abnormal area in the image based on the approximate shape and the profile of the distribution area.

A computer readable recording device according to still another aspect of the present invention has an executable program stored thereon, wherein the program instructs a processor to perform: calculating feature data of each pixel in an image or each area acquired by dividing the image into a plurality of areas; calculating an approximate shape approximating a profile of a distribution area in which the feature data is distributed in a feature space having the feature data as an element; and detecting an abnormal area in the image based on the approximate shape and the profile of the distribution area.

The above and other features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 8 is a flowchart illustrating operations of the image processing device according to modification 1-2;

FIG. 9 is a block diagram illustrating a configuration of an abnormal area detector of an image processing device according to modification 1-3;

FIG. 10 is a flowchart illustrating operations of the image processing device according to modification 1-3;

DETAILED DESCRIPTION OF THE PREFERRED EMBODIMENTS

Figure 1:
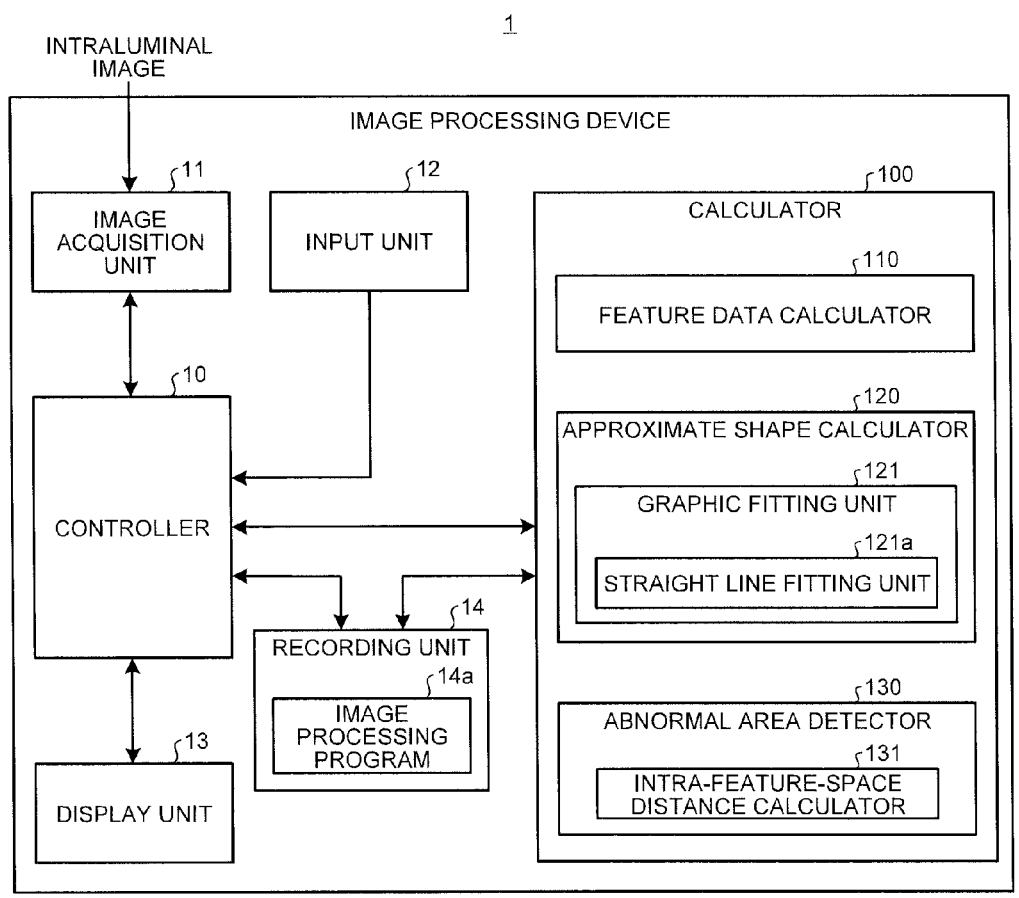
FIG. 1 is a block diagram illustrating a configuration of an image processing device according to a first embodiment of the present invention.

In the following, an image processing device, an image processing method and an image processing program according to embodiments of the present invention will be explained with reference to the drawings. Incidentally, the present invention is not limited to these embodiments. In the description of each drawing, the same reference numerals are applied to the same components.

In the following, as an example, image processing on an intraluminal image (hereinafter, also simply referred to as "image") in which the inside of a lumen of a subject is captured by a medical observation device such as an endoscope will be explained. Such an intraluminal image is, for example, a color image having the image level (i.e. image value) with respect to each of color components R (red), G (green) and B (blue) in each pixel position. Also, generally, an intraluminal image images a mucous membrane of an interior wall of the gastrointestinal tract and sometimes images food residue or bubble. An examination area in the intraluminal image is basically a mucosal area and an imaged lesion often has a color tone different from that of a normal mucous membrane in the mucosal area.

Incidentally, the present invention is not limited to an intraluminal image but is widely applicable to an image processing device that detects a specific area from other general images.

First Embodiment

FIG. 1 is a block diagram illustrating a configuration of an image processing device according to a first embodiment of the present invention. As illustrated in FIG. 1, an image processing device 1 includes: a controller 10 configured to control the entire operation of the image processing device 1; an image acquisition unit 11 configured to acquire image data of an intraluminal image captured by a medical observation device; an input unit 12 configured to accept an input signal input from the outside; a display unit 13 configured to display a screen including the intraluminal image and various kinds of information; a recording unit 14; and a calculator 100 configured to perform calculation processing to detect an abnormal area from the intraluminal image.

The controller 10 is realized by hardware such as a CPU, and, by reading various programs stored in the recording unit 14, and gives an instruction and transfers data to each unit forming the image processing device 1 according to image data input from the image acquisition unit 11, an operation signal input from the input unit 12 and the like, so as to control the entire operation of the image processing device 1 in an integrated manner.

The image acquisition unit 11 is adequately configured according to an aspect of a system including a medical observation device. For example, in a case where the medical observation device is a capsule endoscope and a transportable recording medium is used to transfer image data of an intraluminal image to the medical observation device, the image acquisition unit 11 is configured with a reader device that is detachably attached to this recording medium and reads the image data stored in the recording medium. Also, in the case of setting a server to store image data of an intraluminal image acquired by a medical observation device, the image acquisition unit 11 is configured with a communication device and the like connected to the server and acquires the image data by data communication with the server. Alternatively, the image acquisition unit 11 may be configured with an interface device and the like to input an image signal from a medical observation device such as an endoscope via a cable.

The input unit 12 is realized by, for example, a keyboard, a mouse, a touch panel or various switches, and outputs an input signal accepted from the outside to the controller 10.

The display unit 13 is realized by a display device such as an LCD and an EL display.

The recording unit 14 is realized by an information recording medium and its reading device such as various IC memories including a ROM and RAM of an overwritable flash memory, a built-in or external hard disk, a CD-ROM, or the like. In addition to the image data of an intraluminal image acquired in the image acquisition unit 11, the recording unit 14 stores programs to operate the image processing device 1 and cause the image processing device 1 to execute various functions, and data used during execution of these programs. For example, the recording unit 14 stores an image processing program 14a to detect an abnormal area from an intraluminal image.

The calculator 100 is realized by hardware such as a CPU, and, by reading the image processing program 14a, performs various kinds of calculation processing to process image data of an intraluminal image and detect an abnormal area of a lesion candidate area from the intraluminal image. The calculator 100 includes: a feature data calculator 110 configured to calculate the feature data of each pixel in an image; an approximate shape calculator 120 configured to calculate an approximate shape (hereinafter, also referred to as "model") approximating the profile of a distribution area (hereinafter, also referred to as "distribution profile") in which the feature data is distributed in a feature space having the feature data as elements; and an abnormal area detector 130 configured to detect an abnormal area in the image based on a correlation between the approximate shape and the distribution profile.

Among these, preferably, the feature data calculator 110 calculates two or more kinds of feature data. By this means, after subsequent processing, a two-or-more-dimensional feature space formed on axes corresponding to these two or more kinds of feature data is generated.

The approximate shape calculator 120 includes a graphic fitting unit 121 configured to fit a geometric graphic to a distribution profile of feature data, and uses a graphic fitted by the graphic fitting unit 121 as an approximate shape of the distribution profile of feature data. To be more specific, the graphic fitting unit 121 includes a straight line fitting unit 121a configured to fit a straight line to the distribution profile of feature data.

The abnormal area detector 130 includes an intra-feature-space distance calculator 131 configured to calculate an intra-feature-space distance between the feature data of each pixel in an image and the above model, and detects an abnormal area based on the intra-feature-space distance.

Figure 2:
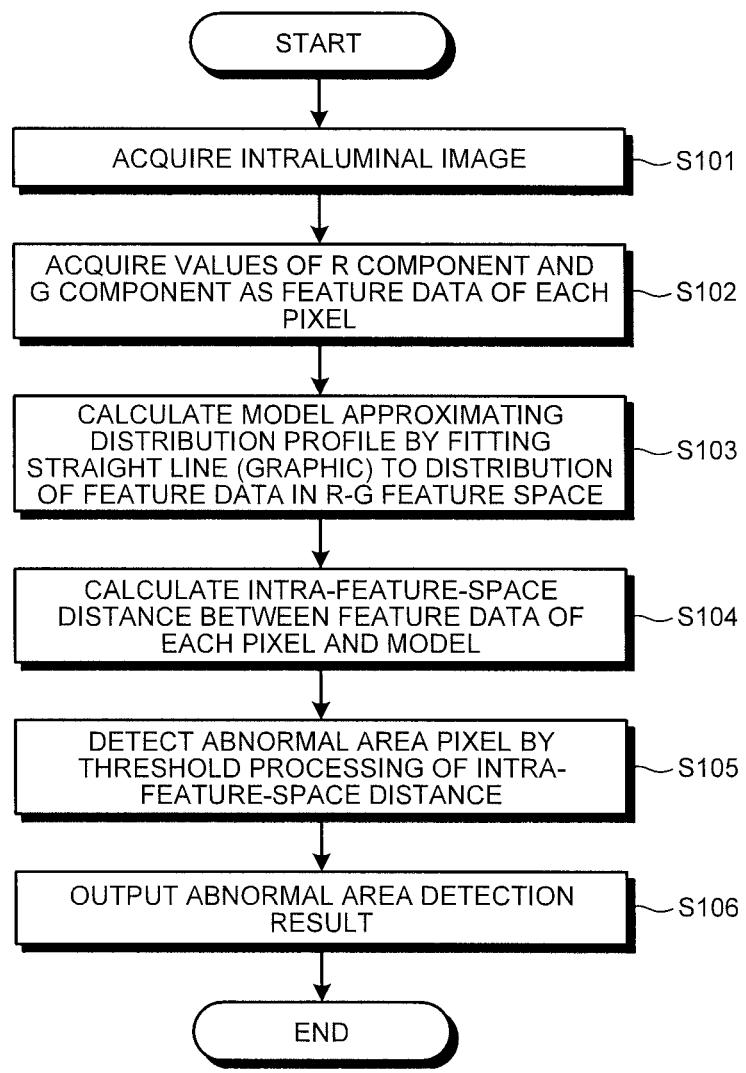
FIG. 2 is a flowchart illustrating operations of the image processing device illustrated in FIG. 1.

Next, operations of the image processing device 1 will be explained. FIG. 2 is a flowchart illustrating the operations of the image processing device 1.

First, in step S101, the calculator 100 acquires an image of a processing target from the recording unit 14.

In subsequent step S102, the feature data calculator 110 acquires a value of the R component and a value of the G component as the feature data of each pixel. Here, the reason for acquiring the values of the R component and the G component is that these two components are components having different absorption/scattering levels in a living body and it is possible to accurately detect a lesion based on a difference between these components. Of course, combinations of other color components or a secondary value calculated by known conversion processing may be used as feature data. To be more specific, it is possible to use the brightness and color difference found by YCbCr conversion or the hue, saturation, intensity and the like found by HSI conversion.

In step S103, in a two-dimensional feature space (R-G feature space) having the values of the R component and the G component as axes, the straight line fitting unit 121a fits a straight line (i.e. graphic) to distribution of the feature data calculated in step S102 so as to calculate a model approximating a distribution profile of the feature data. To be more specific, following Expression (1) representing a straight line is fitted to the distribution of feature data by a least-square method to calculate coefficients "a" and "b."

$$G = a \times R + b \qquad (1)$$

In Expression (1), the coefficients "a" and "b" are given by following Expression (2) acquired by the least-square method using values Ri and Gi (i=1 to n, where "n" represents the data number) of the R component and the G component of each pixel forming the distribution of feature data.

$$\begin{bmatrix} a \\ b \end{bmatrix} = (A^t \times A)^{-1} \times A^t \times \begin{bmatrix} G1 \\ G2 \\ \vdots \\ Gn \end{bmatrix} \qquad (2)$$

$$\text{where } A = \begin{bmatrix} R1 & 1 \\ R2 & 1 \\ \vdots & \vdots \\ Rn & 1 \end{bmatrix}.$$

Figure 3:
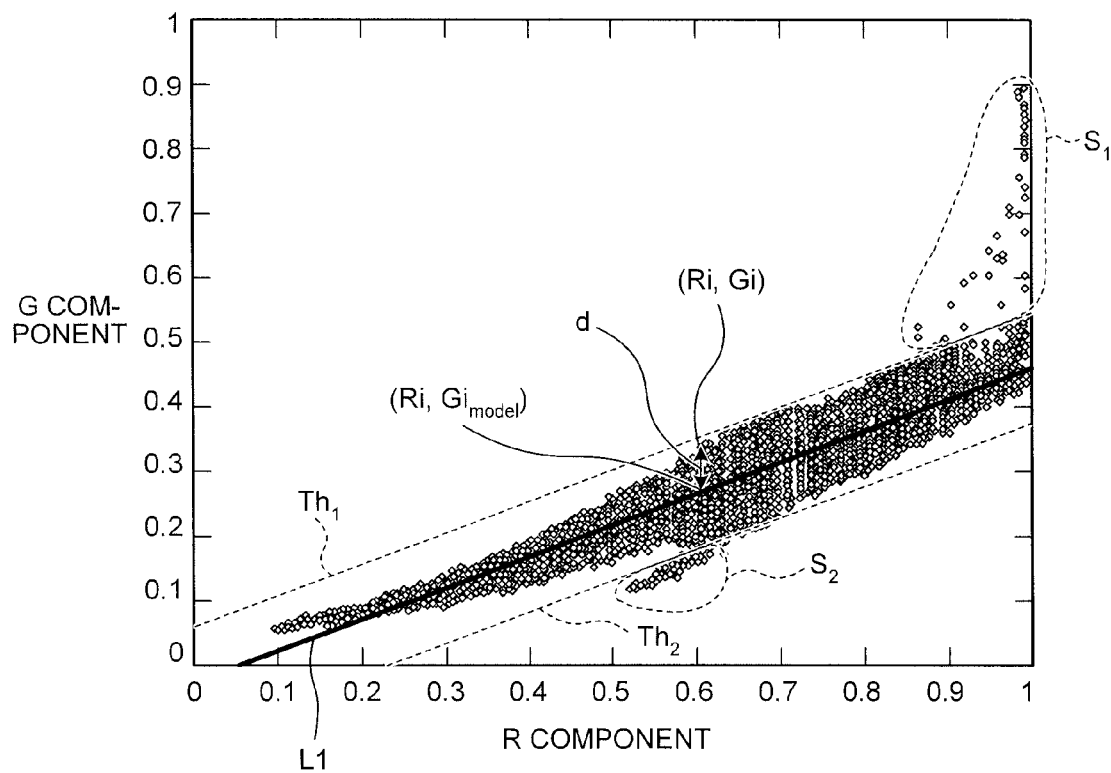
FIG. 3 is a graph illustrating an example of distribution of feature data in an R-G feature space and a result of fitting a straight line to the distribution.

FIG. 3 is a graph illustrating an example of distribution of feature data (Ri, Gi) in the R-G feature space and a result of fitting a straight line to this distribution. Incidentally, in FIG. 3, the values of the R component and the G component are standardized such that the upper limit is "1." A straight line L1 illustrated in FIG. 3 is a model (or straight line model) approximating the distribution profile of feature data and is represented by the expression "G=$a_0 \times R + b_0$" (where $a_0$ and $b_0$ are constant numbers).

Although above Expression (1) is used for fitting in the first embodiment, the expression "(aR+bG+c=0)" for other straight lines may be used.

In step S104, the intra-feature-space distance calculator 131 calculates the intra-feature-space distance between the feature data of each pixel and the model. To be more specific, the value Ri of the R component of each pixel is substituted to "R" on the right side of the expression "G=$a_0 \times R + b_0$" of a straight line model to calculate a value $Gi_{model}$ of the G component on the straight line, and an absolute value "d=|Gi−$Gi_{model}$|" corresponding to a difference between this value $Gi_{model}$ and an actual value Gi of the G component is calculated. This value "d" indicates the intra-feature-space distance parallel to the G component axis between the straight line model and a point (Ri, Gi) indicating the feature data of each pixel.

Incidentally, as the intra-feature-space distance, it may be possible to use the distance between the point (Ri, Gi) and the straight line model, that is, the length of a perpendicular provided from the point (Ri, Gi) to the straight line "aR+bG+c=0."

In step S105, by threshold processing of the intra-feature-space distance "d," the abnormal area detector 130 detects a pixel (or abnormal area pixel) corresponding to an abnormal area of a lesion candidate area. To be more specific, a pixel having the intra-feature-space distance "d" equal to or greater than a predetermined threshold is calculated, and the pixel is detected as an abnormal area pixel. For example, in FIG. 3, pixels included in areas (represented by areas $S_1$, $S_2$ and the like) over thresholds $Th_1$ and $Th_2$ are detected as abnormal area pixels.

Further, in step S106, the calculator 100 outputs a detection result of abnormal area pixels. To be more specific, the abnormal area pixels detected in step S105 are marked on the image and displayed on the display unit 13. In addition, the calculator 100 records the detection result of the abnormal area pixels in the recording unit 14. By this means, the processing in the image processing device 1 ends.

As described above, according to the first embodiment, pixels, in which the intra-feature-space distance with respect to a model approximating a distribution profile of feature data of pixels in an image is equal to or greater than a predetermined threshold, are detected as a lesion, and therefore it is possible to stably detect the lesion regardless of the size of the lesion in the image.

Incidentally, in FIG. 3, pixels included in the area $S_1$ have a characteristic that the G component is large with respect to the model. Such an abnormal area can be a lesion of a color fading system (or white color system) in which the G component is less absorbed. Meanwhile, pixels included in the area $S_2$ have a characteristic that the G component is small with respect to the model. Such an abnormal area can be a lesion of a red color system in which the G component is more absorbed. Therefore, the intra-feature-space distance "d" may be evaluated also considering the sign thereof, and a lesion type may be identified.

Modification 1-1

Next, modification 1-1 of the first embodiment will be explained.

Figure 4:
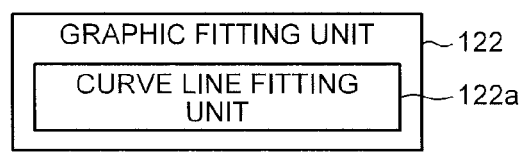
FIG. 4 is a block diagram illustrating a configuration of a graphic fitting unit of an image processing device according to modification 1-1.

An image processing device according to modification 1-1 includes a graphic fitting unit 122 illustrated in FIG. 4, instead of the graphic fitting unit 121 illustrated in FIG. 1. The graphic fitting unit 122 includes a curve line fitting unit 122a configured to fit a curve line to a distribution profile of feature data. Other configurations are similar to those of the first embodiment.

Figure 5:
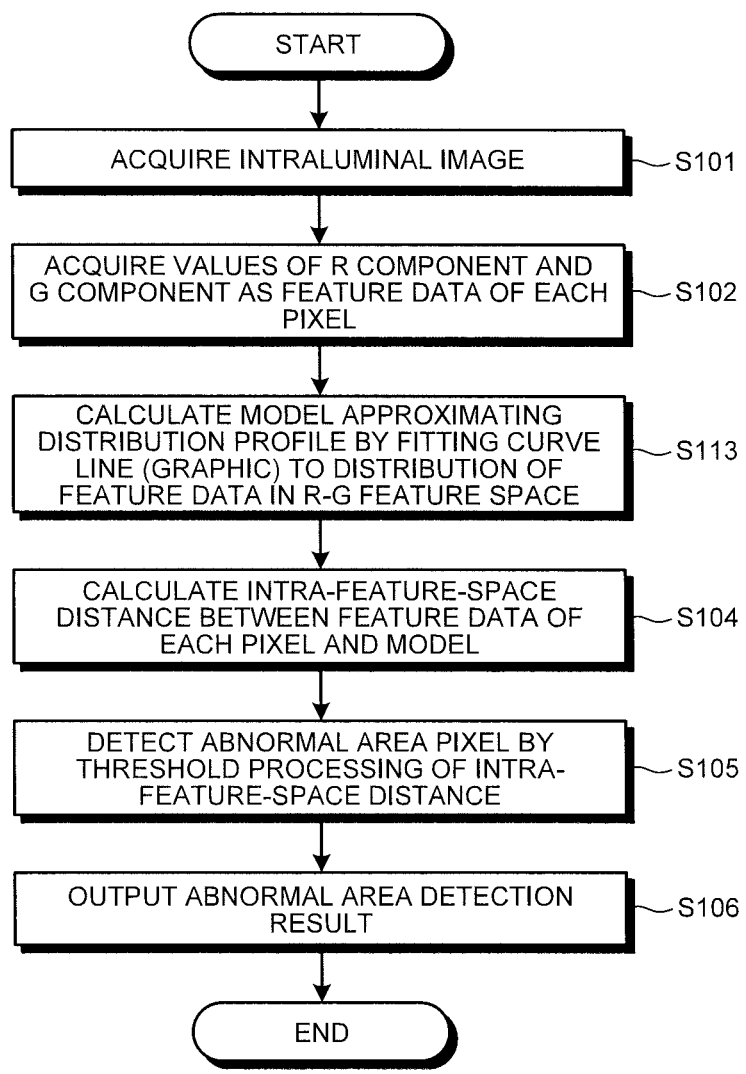
FIG. 5 is a flowchart illustrating operations of the image processing device according to modification 1-1.

FIG. 5 is a flowchart illustrating operations of the image processing device according to modification 1-1. Incidentally, operations in steps S101, S102 and S104 to S106 are similar to the first embodiment.

In step S113 subsequent to step S102, by fitting a curve line (i.e. graphic) to the distribution of feature data calculated in step S102 in the R-G feature space, the curve line fitting unit 122a calculates a model approximating a distribution profile of the feature data. To be more specific, following Expression (3) representing a curve line is fitted to the distribution of feature data by the least-square method to calculate coefficients "a," "b" and "c."

$$G = a \times R^2 + b \times R + c \qquad (3)$$

In Expression (3), the coefficients "a," "b" and "c" are given by following Expression (4) acquired by the least-square method using values Ri and Gi (i=1 to n, where "n" represents the data number) of the R component and the G component of each pixel forming the distribution of feature data.

$$\begin{bmatrix} a \\ b \\ c \end{bmatrix} = (A^t \times A)^{-1} \times A^t \times \begin{bmatrix} G1 \\ G2 \\ \vdots \\ Gn \end{bmatrix} \quad (4)$$

$$\text{where } A = \begin{bmatrix} R1^2 & R1 & 1 \\ R2^2 & R2 & 1 \\ \vdots & \vdots & \vdots \\ Rn^2 & Rn & 1 \end{bmatrix}.$$

Figure 6:
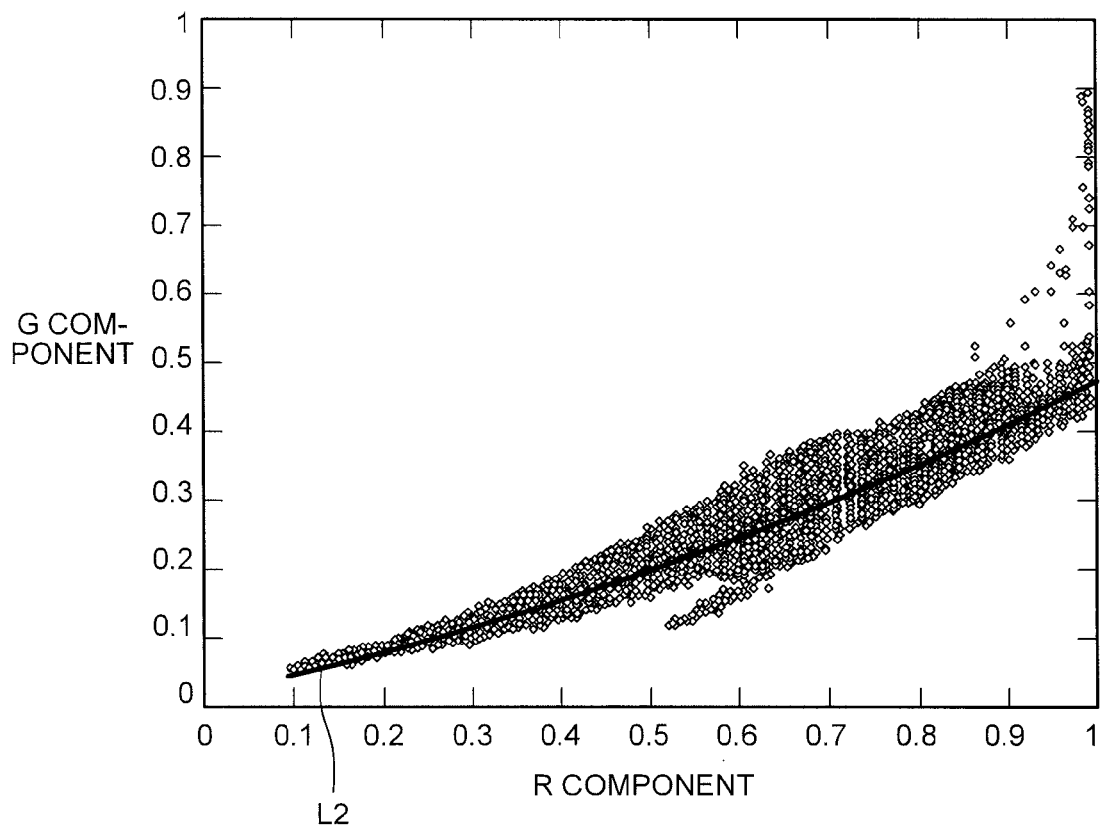
FIG. 6 is a graph illustrating an example of distribution of feature data in an R-G feature space and a result of fitting a curve line to the distribution.

FIG. 6 is a graph illustrating an example of distribution of feature data (Ri, Gi) in the R-G feature space and a result of fitting the quadratic curve to this distribution. A quadratic curve L2 illustrated in FIG. 6 is a model (curve line model) approximating the distribution profile of feature data and is represented by the expression "G=$a_1 \times R^2 + b_1 \times R + c_1$" (where $a_1$, $b_1$ and $c_1$ are constant numbers).

Then, operations of the image processing device proceed to step S104.

Although a quadratic curve is used for fitting in modification 1-1, other curve lines may be used. For example, curve lines such as power (G=$a \times R^b$), logarithm (G=$a \times \log R + b$) and exponent (G=$a \times b^R$) can be used for fitting.

As described above, according to modification 1-1, a distribution profile of feature data is approximated by a curve line (i.e. graphic) having a higher flexibility than a straight line, and therefore it is possible to detect a lesion more stably.

Modification 1-2

Next, modification 1-2 of the first embodiment will be explained.

Figure 7:
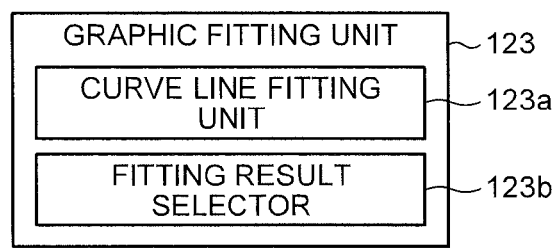
FIG. 7 is a block diagram illustrating a configuration of a graphic fitting unit of an image processing device according to modification 1-2.

An image processing device according to modification 1-2 includes a graphic fitting unit 123 illustrated in FIG. 7, instead of the graphic fitting unit 121 illustrated in FIG. 1. The graphic fitting unit 123 includes: a curve line fitting unit 123a configured to fit a plurality of curve lines (i.e. graphics) to a distribution profile of feature data; and a fitting result selector 123b configured to select a result of the highest fitting accuracy among the results of fitting the plurality of curve lines.

FIG. 8 is a flowchart illustrating operations of the image processing device according to modification 1-2. Incidentally, the operations in steps S101, S102 and S104 to S106 are similar to the first embodiment.

In step S123 subsequent to step S102, by fitting a plurality of curve lines (i.e. graphics) to the distribution of feature data calculated in step S102 in the R-G feature space, the curve line fitting unit 123a calculates a plurality of models approximating a distribution profile of the feature data. To be more specific, similar to modification 1-1, processing of fitting a curve line expression to the distribution of feature data and calculating coefficients is performed for expressions of multiple types of curve lines (such as quadratic curve, cubic curve, power, exponent and logarithm). At this time, an expression of a straight line (i.e. linear curve) may be included in fitting processing.

In step S124, the fitting result selector 123b selects a curve line of the highest fitting accuracy and uses the selected curve line as a model of the distribution profile. To be more specific, in step S123, for the expression "G=f(R)" of each model calculated in step S123, an evaluation value E is calculated using an error estimation function in the least-square method shown in following Expression (5), so as to select a fitting result of a curve line in which this evaluation value E is minimum.

$$E = \sum_i (Gi - f(Ri))^2 \quad (5)$$

For example, in a case where a fitted curve line is the quadratic curve shown in Expression (3), an evaluation value is given by following Expression (6).

$$E = \sum_i \{Gi - (a \times Ri^2 + b \times Ri + c)\}^2 \quad (6)$$

Then, the operations of the image processing device proceed to step S104.

As described above, according to modification 1-2, a distribution profile of feature data is approximated by a curve line (i.e. graphic) of the highest fitting accuracy, and therefore it is possible to detect a lesion more stably.

The evaluation value E is calculated using an error in the G component axis between a point (Ri, Gi) representing feature data in the R-G feature space and a curve line model (G=f(R)) in above modification 1-2, but the evaluation value may be calculated by summing up distances between the points representing feature data and the curve line model.

Modification 1-3

Next, modification 1-3 of the first embodiment will be explained.

The image processing device according to modification 1-3 includes an abnormal area detector 140 illustrated in FIG. 9, instead of the abnormal area detector 130 illustrated in FIG. 1. The abnormal area detector 140 includes an outlier detector 141 configured to detect an outlier in the distribution of intra-feature-space distances in addition to the intra-feature-space distance calculator 131, and detects an abnormal area based on a detection result of the outlier detector 141.

FIG. 10 is a flowchart illustrating operations of the image processing device according to modification 1-3. Incidentally, the operations in steps S101 to S104 and S106 are similar to the first embodiment.

In step S115 subsequent to step S104, the outlier detector 141 detects an abnormal area pixel by detecting an outlier in the distribution of intra-feature-space distances "d." To be more specific, the variance and standard deviation of all the intra-feature-space distances "d" calculated in step S104 are calculated, and a pixel having the intra-feature-space distance "d" equal to or greater than a predetermined multiple of this standard deviation is detected as an abnormal area pixel. Then, the operation proceeds to step S106.

As described above, according to modification 1-3, an outlier of intra-feature-space distances is detected based on a threshold that is adaptively set according to the distribution of intra-feature-space distances, and therefore it is possible to detect a lesion more stably.

Modification 1-4

Next, modification 1-4 of the first embodiment will be explained.

Figure 11:
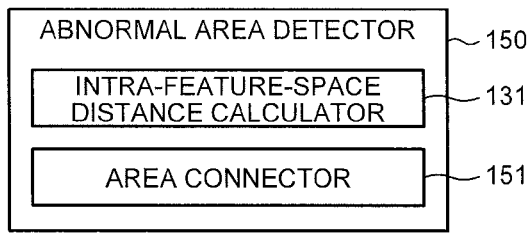
FIG. 11 is a block diagram illustrating a configuration of an abnormal area detector of an image processing device according to modification 1-4.

An image processing device according to modification 1-4 includes an abnormal area detector 150 illustrated in FIG. 11, instead of the abnormal area detector 130 illustrated in FIG. 1. The abnormal area detector 150 includes an area connector 151 configured to detect predetermined pixels based on an intra-feature-space distance "d" and connect the detected pixels in the image, in addition to the intra-feature-space distance calculator 131, and detects an abnormal area based on feature data of the connected area connected by the area connector 151.

Figure 12:
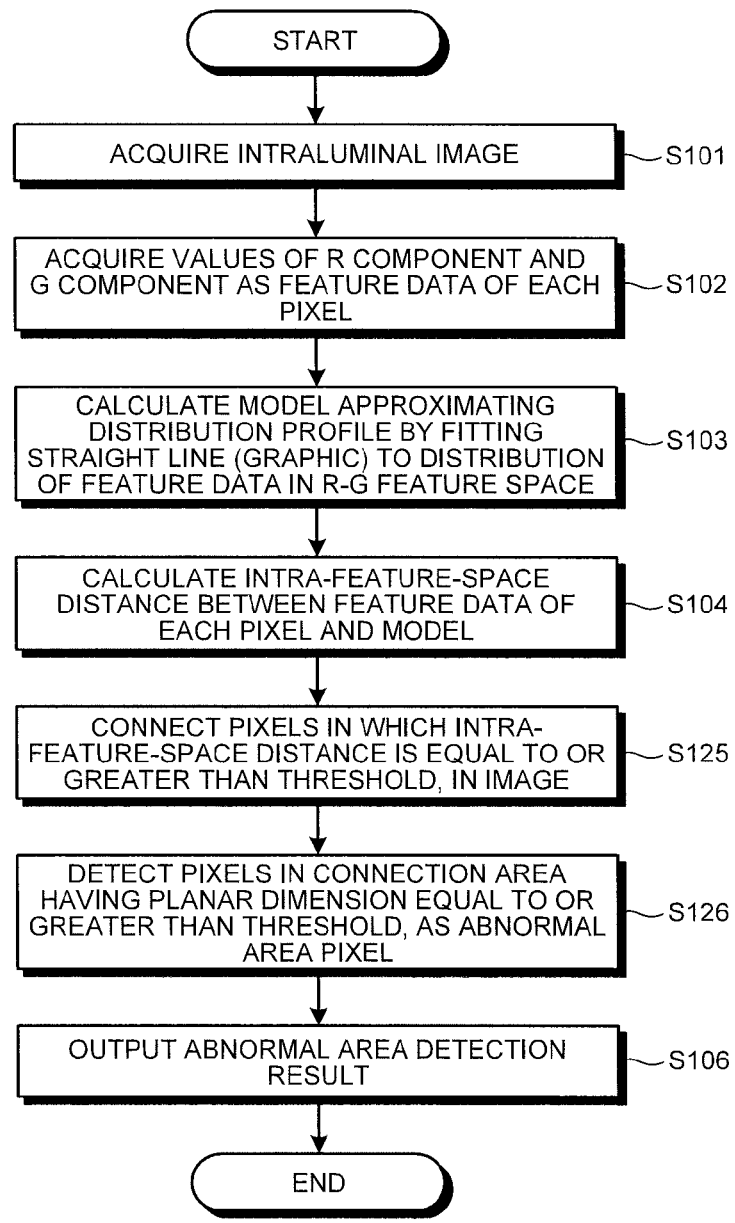
FIG. 12 is a flowchart illustrating operations of the image processing device according to modification 1-4.

FIG. 12 is a flowchart illustrating operations of the image processing device according to modification 1-4. Incidentally, the operations in steps S101 to S104 and S106 are similar to the first embodiment.

In step S125 subsequent to step S104, the area connector 151 connects pixels in which the intra-feature-space distance "d" is equal to or greater than a predetermined threshold, in an image. To be more specific, pixels in which the intra-feature-space distance "d" calculated in step S104 is equal to or greater than a predetermined threshold, are extracted, and the pixels are imaged based on the coordinates of these pixels. Then, by known labeling processing (reference: CG-ARTS Society, "Digital image processing," page 181), a connection area connecting adjacent pixels equal to or greater than a threshold is found.

In subsequent step S126, the abnormal area detector 150 calculates a planar dimension (i.e. pixel number) in the connection area and detects, as abnormal area pixels, pixels in the connection area having a planar dimension equal to or greater than a threshold.

Then, the operation proceeds to step S106.

As described above, according to modification 1-4, among pixels in which the intra-feature-space distance "d" is equal to or greater than a threshold, only pixels forming an area of a predetermined size in an image are detected as abnormal area pixels, and therefore it is possible to suppress false detection of minute noise and the like, and detect a lesion more stably.

Second Embodiment

Next, a second embodiment of the present invention will be explained.

Figure 13:
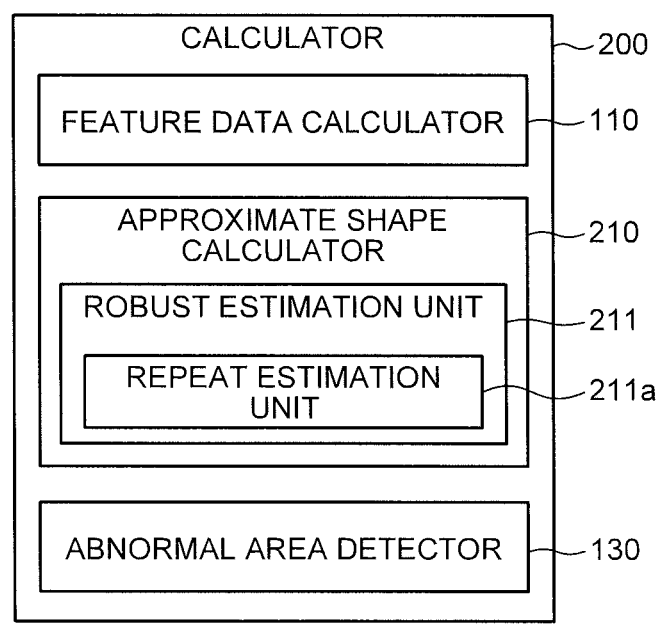
FIG. 13 is a block diagram illustrating a configuration of a calculator of an image processing device according to a second embodiment of the present invention.

An image processing device according to the second embodiment includes a calculator 200 illustrated in FIG. 13, instead of the calculator 100 illustrated in FIG. 1. The calculator 200 includes the feature data calculator 110, an approximate shape calculator 210 and the abnormal area detector 130. Among these, the configurations and operations of the feature data calculator 110 and the abnormal area detector 130 are similar to the first embodiment.

The approximate shape calculator 210 includes a robust estimation unit 211 configured to estimate a model excluding an outlier in the distribution of feature data, and approximates a distribution profile of feature data based on the estimation result in the robust estimation unit 211. To be more specific, the robust estimation unit 211 includes a repeat estimation unit 211a configured to recursively repeat model estimation and outlier removal based on the estimation result.

Figure 14:
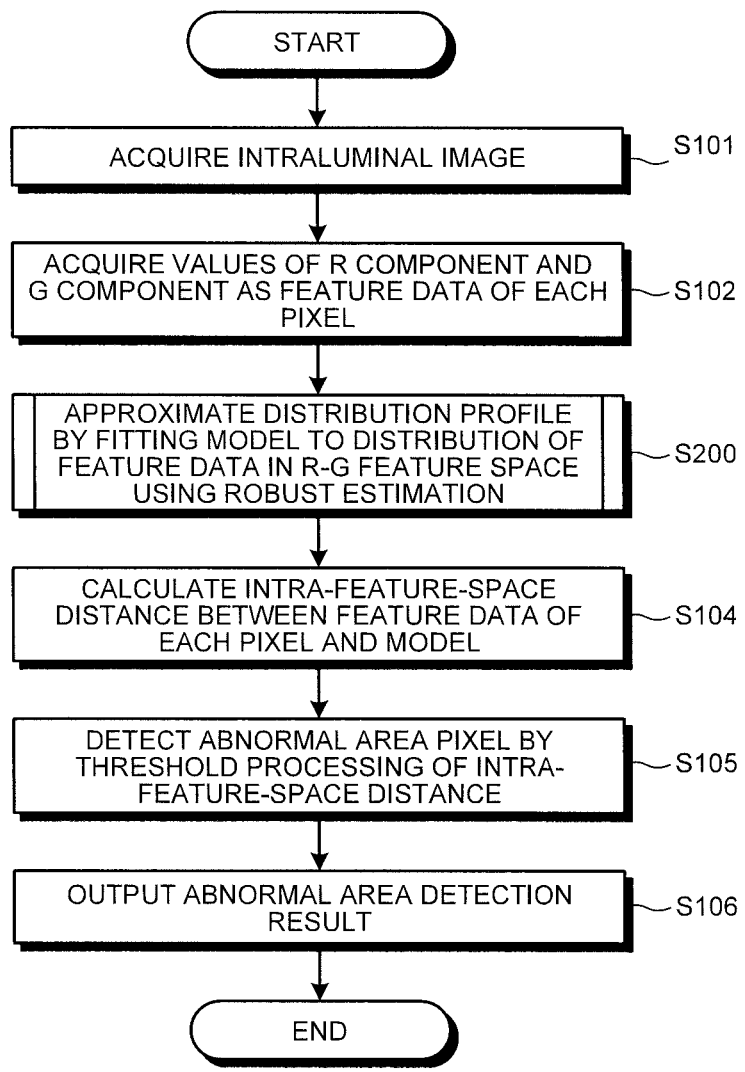
FIG. 14 is a flowchart illustrating operations of the image processing device according to the second embodiment.

FIG. 14 is a flowchart illustrating operations of the image processing device according to the second embodiment. Incidentally, the operations in steps S101, S102 and S104 to S106 are similar to the first embodiment.

In step S200 subsequent to step S102, the robust estimation unit 211 approximates a distribution profile of feature data by using robust estimation and applying a model to the distribution of feature data calculated in step S102 in the R-G feature space.

Figure 15:
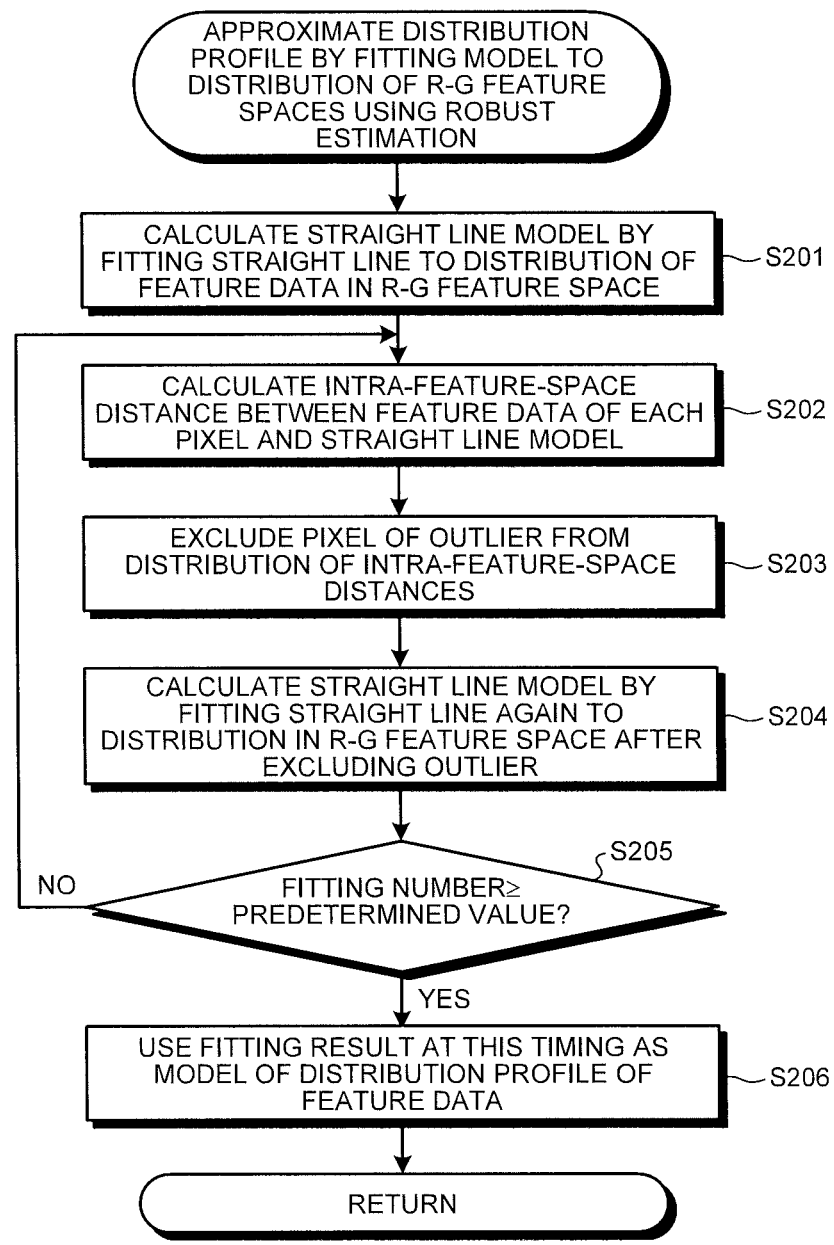
FIG. 15 is a flowchart illustrating specific operations in step S200 of FIG. 14.

Specific operations in this step S200 will be explained with reference to FIG. 15.

In step S201, the repeat estimation unit 211a calculates a straight line model by fitting a straight line to the distribution of feature data in the R-G feature space (see FIG. 3). Incidentally, the specific operation in this step S201 is the same as that explained in step S103 of FIG. 2.

In subsequent step S202, the repeat estimation unit 211a calculates the intra-feature-space distance "d" (see FIG. 3) between the feature data of each pixel and the straight line model. Incidentally, the specific operation in this step S202 is the same as that explained in step S104 of FIG. 2.

In step S203, the repeat estimation unit 211a excludes a pixel of an outlier with respect to the distribution of intra-feature-space distances "d." To be more specific, the variance and standard deviation of all the intra-feature-space distances "d" calculated in step S202 are calculated, and pixels having the intra-feature-space distance "d" equal to or greater than a predetermined multiple of this standard deviation are excluded as outliers.

In step S204, the repeat estimation unit 211a calculates a straight line model by fitting a straight line again to the distribution of feature data in the R-G feature space after excluding the outliers. Incidentally, the specific operation in this step S204 is the same as that in step S201, except for that the number of data (i.e. pixel values) to be used decreases due to the outlier removal.

In step S205, the repeat estimation unit 211a decides whether the fitting number is equal to or greater than a predetermined value. In a case where the fitting number is less than the predetermined value (step S205: No), the repeat estimation unit 211a repeats steps S202 to S204. By contrast, in a case where the fitting number is equal to or greater than the predetermined value (step S205: Yes), the fitting result in step S204 at this time is used as a model of the distribution profile of feature data (step S206).

Then, the operation returns to the main routine.

As described above, according to the second embodiment, by excluding an outlier from the distribution of feature data, it is possible to approximate the distribution profile of feature data more accurately, and therefore it is possible to detect a lesion more stably.

Modification 2-1

Next, modification 2-1 of the second embodiment will be explained.

Figure 16:
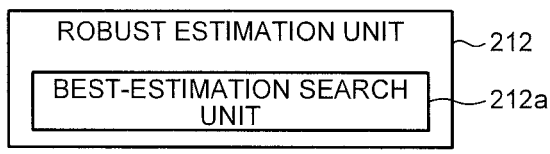
FIG. 16 is a block diagram illustrating a configuration of a robust estimation unit of an image processing device according to modification 2-1.

An image processing device according to modification 2-1 includes a robust estimation unit 212 illustrated in FIG. 16, instead of the robust estimation unit 211 illustrated in FIG. 13. The robust estimation unit 212 includes a best-estimation search unit 212a configured to search an estimation result of the highest estimation accuracy from a plurality of estimation results estimated based on a plurality of different items of sampling data extracted from the distribution of feature data.

Next, operations of the image processing device according to modification 2-1 will be explained. The overall operation of the image processing device according to modification 2-1 is the same as that illustrated in FIG. 14, except for specific operations in step S200.

Figure 17:
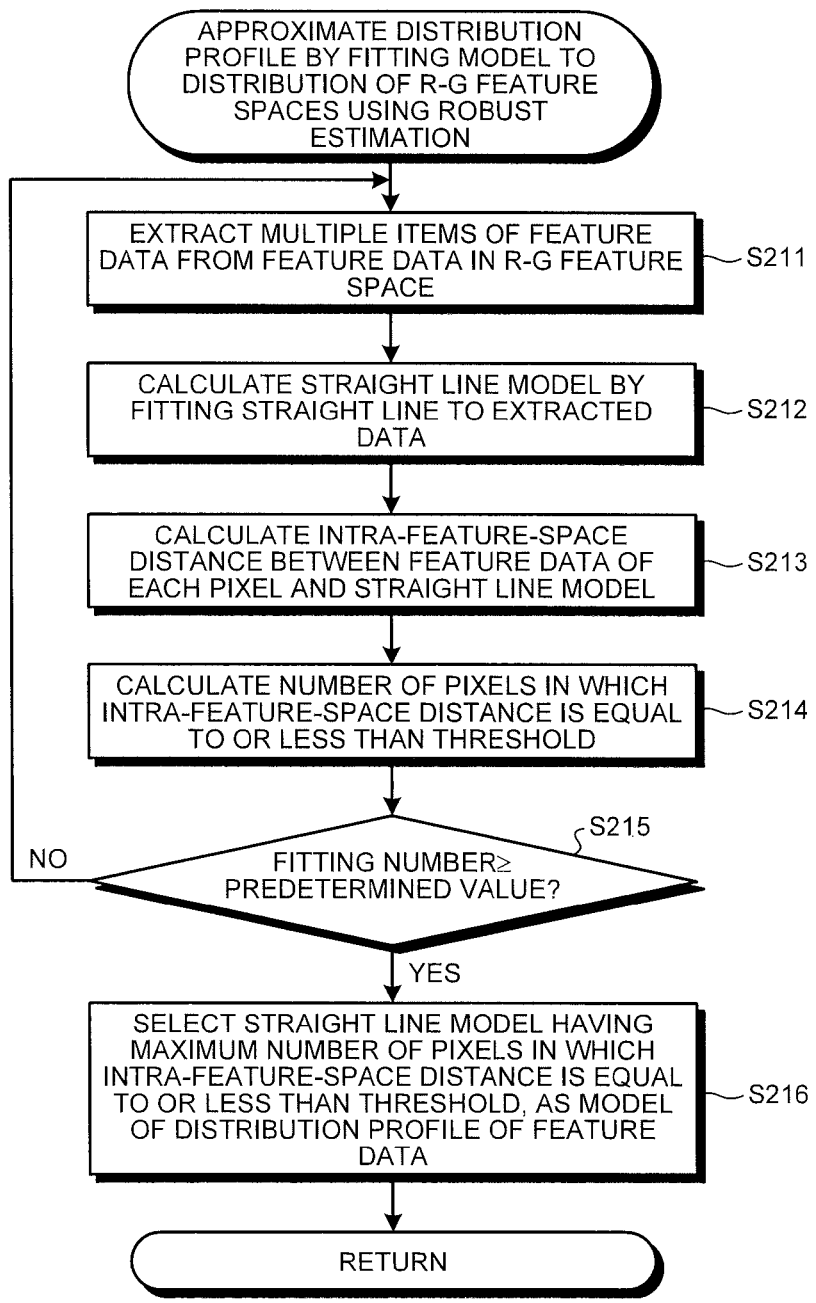
FIG. 17 is a flowchart illustrating operations of the image processing device according to modification 2-1.

FIG. 17 is a flowchart illustrating the specific operations in step S200 of FIG. 14.

First, in step S211, the best-estimation search unit 212a extracts a plurality of data items of feature data from the distribution of feature data in the R-G feature space. Incidentally, the extracted data of feature data may be random.

In subsequent step S212, the best-estimation search unit 212a calculates a straight line model by fitting a straight line to the extracted data of feature data. Incidentally, the specific operation in this step S212 is the same as that in step S103 of FIG. 2, except for that data (i.e. pixel value) to be used varies.

In step S213, the best-estimation search unit 212a calculates the intra-feature-space distance "d" (see FIG. 3) between the feature data of each pixel and the straight line model. Incidentally, the specific operation in this step S213 is the same as that explained in step S104 of FIG. 2.

In step S214, the best-estimation search unit 212a calculates a number N of pixels having the intra-feature-space distance "d" equal to or less than a predetermined threshold.

In step S215, the best-estimation search unit 212a decides whether the fitting number is equal to or greater than a predetermined value. In a case where the fitting number is less than the predetermined value (step S205: No), the best-estimation search unit 212a repeats the processing in steps S211 to S214. By contrast, in a case where the fitting number is equal to or greater than the predetermined value (step S215: Yes), a model is selected in which the number N of pixels having the intra-feature-space distance "d" equal to or less than the threshold is maximum, and this model is used as a model of the distribution profile of feature data (step S216).

Then, the operation of the image processing device returns to the main routine.

As described above, according to modification 2-1, by searching the best estimation result from a plurality of different estimation results acquired by performing estimation several times, it is possible to approximate the distribution profile of feature data more accurately and therefore it is possible to detect a lesion more stably.

Third Embodiment

Next, a third embodiment of the present invention will be explained.

Figure 18:
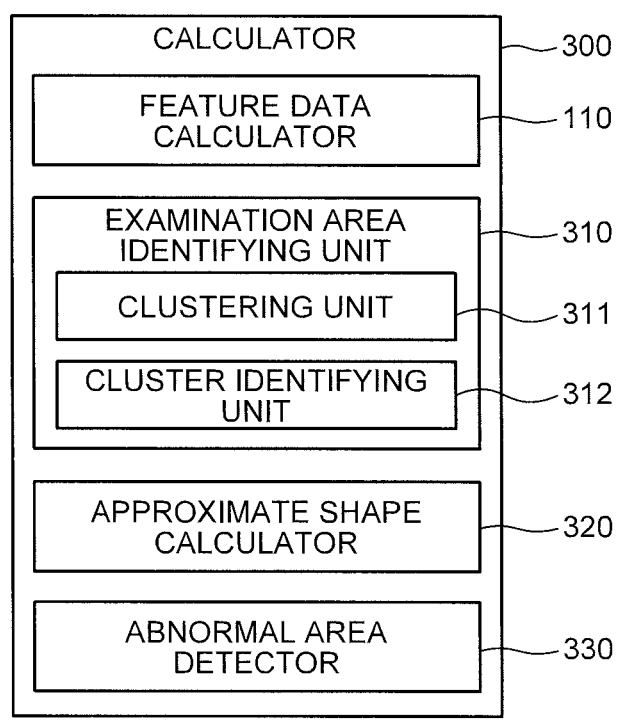
FIG. 18 is a block diagram illustrating a configuration of a calculator of an image processing device according to a third embodiment of the present invention.

An image processing device according to the third embodiment includes a calculator 300 illustrated in FIG. 18, instead of the calculator 100 illustrated in FIG. 1. The calculator 300 includes: the feature data calculator 110; an examination area identifying unit 310 configured to identify an examination area in an image; an approximate shape calculator 320 configured to calculate an approximate shape approximating a distribution profile of feature data in the R-G feature space, with respect to the examination area identified in the examination area identifying unit 310; and an abnormal area detector 330 configured to detect an abnormal area from the examination area based on the distribution profile and its approximate shape. Among these, the configuration and operation of the feature data calculator 110 are similar to those of the first embodiment. Also, the configurations and operations of the approximate shape calculator 320 and the abnormal area detector 330 are the same as those in the approximate shape calculator 120 and the abnormal area detector 130 illustrated in FIG. 1, except for that a processing target is not the overall image but is limited to an examination area.

The examination area identifying unit 310 includes: a clustering unit 311 configured to divide the distribution of the feature data of each pixel in an image into clusters; and a cluster identifying unit 312 configured to identify a cluster including the feature data of each pixel in an examination area, and identifies the examination area based on the cluster identification result in the cluster identifying unit 312.

Figure 19:
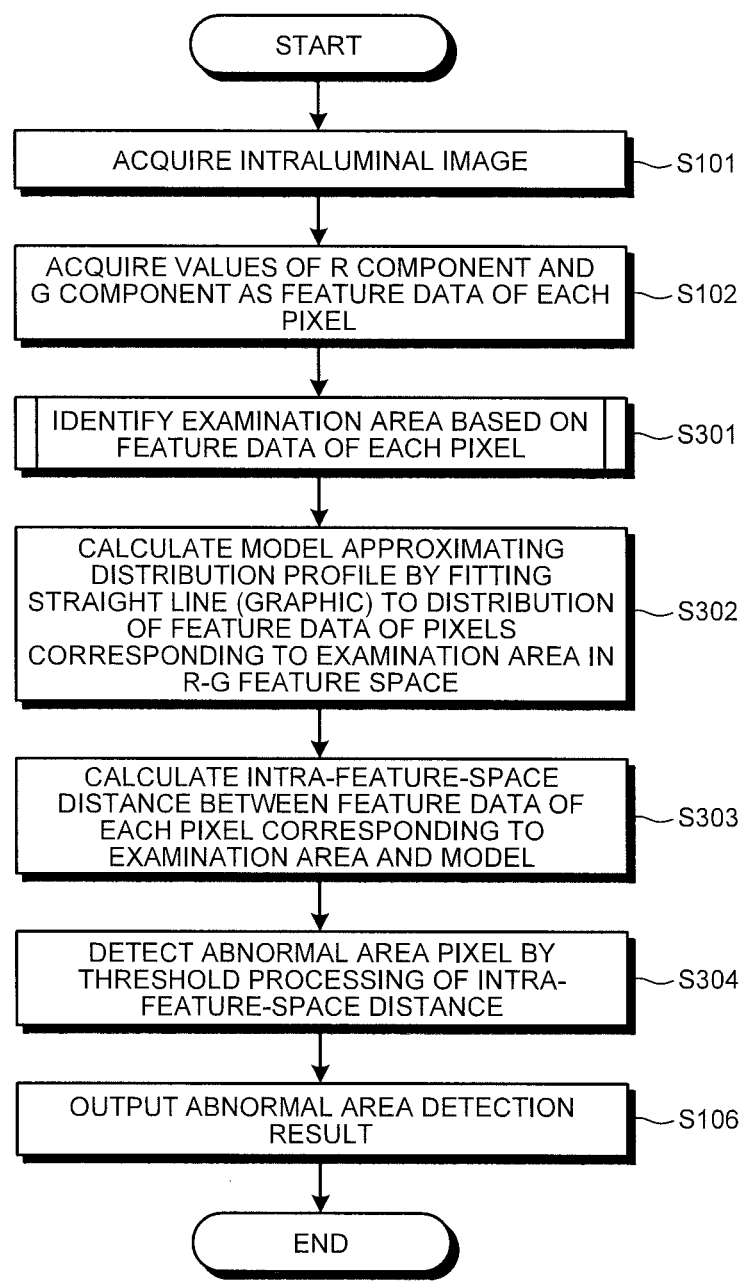
FIG. 19 is a flowchart illustrating operations of the image processing device according to the third embodiment.

FIG. 19 is a flowchart illustrating operations of the image processing device according to the third embodiment. Incidentally, the operations in steps S101, S102 and S106 are similar to the first embodiment.

In step S301 subsequent to step S102, the examination area identifying unit 310 identifies an examination area based on the feature data of each pixel.

Specific operations in this step S301 will be explained with reference to FIG. 20 and FIG. 21.

Figure 20:
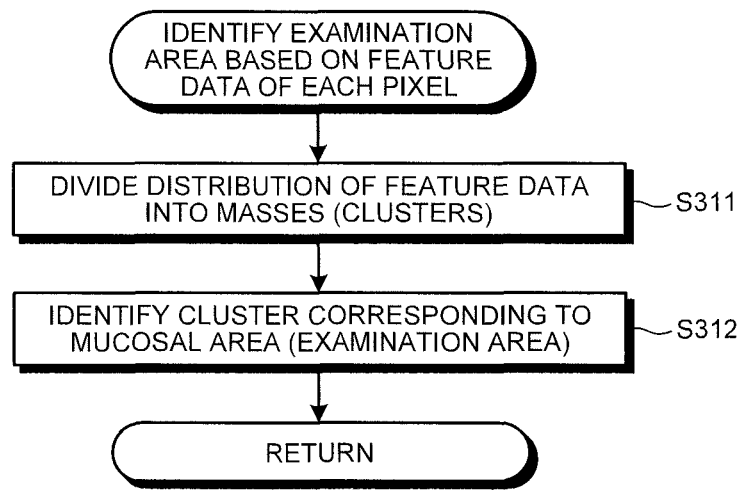
FIG. 20 is a flowchart illustrating specific operations in step S301 of FIG. 19.
Figure 21:
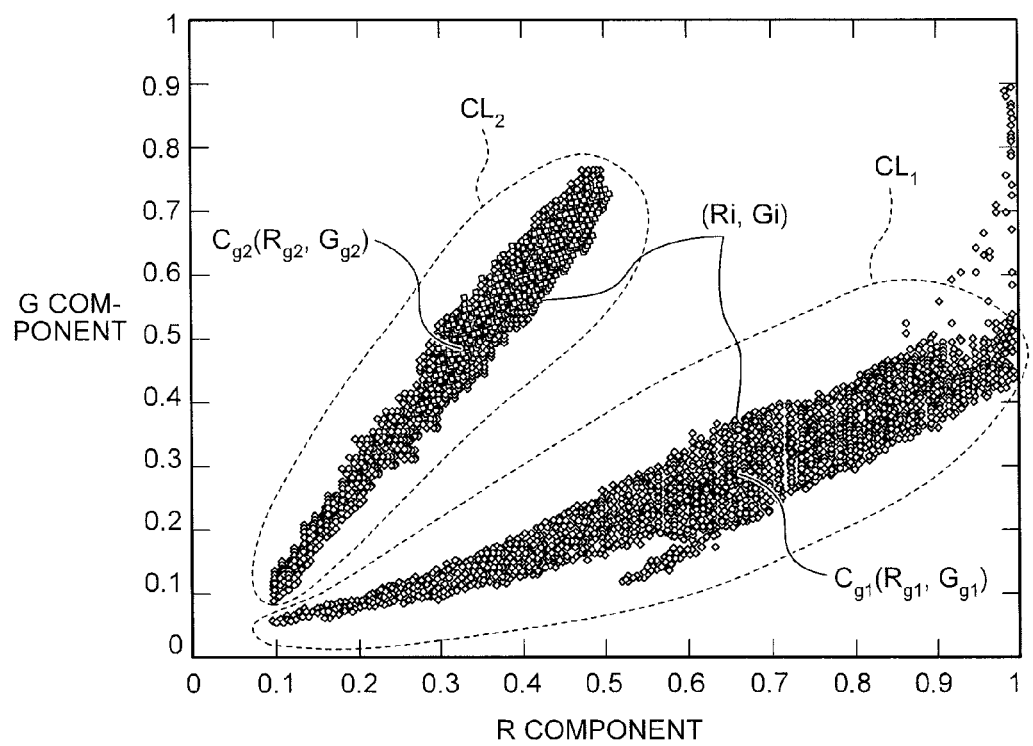
FIG. 21 is a pattern diagram illustrating an example where feature data of pixels in an image is clustered into two clusters.

In step S311 of FIG. 20, the clustering unit 311 divides the distribution of the feature data of each pixel in an image into clusters (i.e. clustering). A clustering method can be realized using a known method such as a hierarchical method, k-means method (reference: CG-ARTS Society, "Digital image processing," page 231), expectation-maximization algorithm (EM algorithm) and self-organizing map. FIG. 21 illustrates an example where feature data (Ri, Gi) of pixels in an image is clustered into two clusters $CL_1$ and $CL_2$.

In subsequent step S312, the cluster identifying unit 312 identifies a cluster corresponding to a mucosal area that is an examination area. As a cluster identifying method, several methods can be used. In the following, the feature data distribution of training data (i.e. data including the feature data of each pixel and a decision result of the examination area as a pair) created in advance is approximated by a probability model, and, based on this, a method of identifying a mucosal area will be explained.

First, by dividing the number of pixels belonging to the mucosal area in the training data by the total number of pixels in the training data, the cluster identifying unit 312 estimates occurrence probability Pc of the mucosal area.

Next, the cluster identifying unit 312 estimates a probability density function of feature data distributions in both a mucosal area and a non-mucosal area by applying contaminated normal distribution using a known expectation-maximization algorithm (EM algorithm), to each of the feature data distribution in the mucosal area and the feature data distribution in the non-mucosal area (part other than the mucosal area) in the R-G feature space of the training data. In this case, the probability density function is given by following Expression (7) corresponding to a linear sum expression of normal distribution f(Ci).

$$\text{Probability density function} = \sum_{j=1}^{j_N} a_j \times f_j(Ci) \qquad (7)$$

where $a_j \geq 0$ and $$\sum_{j=1}^{j_N} a_j = 1$$

are established.

In Expression (7), the feature vector Ci denotes a vector representing feature data (Ri, Gi) of pixels in an image. Also, $f_j(ci)$ denotes an expression representing j-th (j=1, 2, ..., $j_N$) normal distribution and $a_j$ denotes a predetermined coefficient (constant number).

Also, the cluster identifying unit 312 calculates center-of-gravity coordinates $C_{g1}$ ($R_{g1}$, $G_{g1}$) and $C_{g2}$ ($R_{g2}$, $G_{g2}$) of clusters $CL_1$ and $CL_2$ cluster-divided by the clustering unit 311. Incidentally, the center-of-gravity denotes an average value of feature data of pixels included in the cluster.

Next, by performing a known maximum posteriori probability estimation using these center-of-gravity coordinates $C_{g1}$ ($R_{g1}$, $G_{g1}$) and $C_{g2}$ ($R_{g2}$, $G_{g2}$), the above occurrence probability Pc and the probability density function $f_1$ of the mucosal area, and the occurrence probability (=1−Pc) and a probability density function $f_2$ of the non-mucosal area, the cluster identifying unit 312 estimates the attribution probability of the center-of-gravity coordinates $C_{g1}$ and $C_{g2}$ with respect to the mucosal area. To be more specific, the attribution probability P with respect to the mucosal area is given by following Expression (8).

Attribution probability with respect to mucosal area = (8)

$$\frac{Pc \times f_1}{Pc \times f_1 + (1 - Pc) \times f_2}$$

The cluster identifying unit 312 identifies a cluster in which the attribution probability of the center-of-gravity coordinates $G_{g1}$ and $C_{g2}$ is equal to or greater than a predetermined threshold (e.g. 0.5), as a cluster representing a mucosal area.

Then, the operation returns to the main routine.

In step S302, the approximate shape calculator 320 calculates a model approximating a distribution profile of feature data by fitting a graphic such as a straight line to the distribution of feature data of pixels corresponding to the examination area in the R-G feature space. In addition to a straight line, the fitted graphic can be other graphics such as a curve line explained in the second embodiment.

In step S303, the abnormal area detector 330 calculates the intra-feature-space distance between the feature data of each pixel corresponding to the examination area and the model acquired by fitting.

In step S304, the abnormal area detector 330 detects abnormal area pixels by performing threshold processing on the intra-feature-space distances.

As described above, according to the third embodiment, since an examination area (or mucosal area) in an image is identified and a distribution profile of feature data of only pixels in the examination area is approximated, it is possible to generate an accurate model that is not influenced by the distribution of feature data in unnecessary areas such as food residue and bubble, and therefore it is possible to stably detect lesion.

Modification 3-1

In the third embodiment, although a method of identifying a cluster of a mucosal area based on a probability model has been explained, other methods can be adopted. For example, after clustering feature data of pixels in an image (step S301), center-of-gravity coordinates ($R_{g1}$, $G_{g1}$) and ($R_{g2}$, $G_{g2}$) of the clusters are calculated, and, by performing threshold processing on these center-of-gravity coordinates, a cluster of a mucosal area may be identified. A threshold used at this time may be acquired from, for example, training data. Alternatively, with respect to each pixel included in each cluster, threshold processing may be performed on the feature data to decide whether it represents a mucosal area, and a cluster in which the ratio of pixels decided as the mucosal area is equal to or greater than a predetermined threshold may be decided as a cluster of the mucosal area. Incidentally, the threshold used for decision of each pixel may be acquired from, for example, training data.

Fourth Embodiment

In the first to third embodiments described above, although detection processing of an abnormal area is performed based on the distribution of the feature data of each pixel in an image, instead of pixel units, the same processing may be performed based on the distribution of the feature data of each area acquired by dividing the image into a plurality of areas.

For example, the image is divided into the plurality of areas as follows. First, the edge strength of each pixel included in an image of a processing target is calculated. When calculating the edge strength, a known method such as differential filter processing by a Sobel filter or the like may be adopted. Next, the image is divided into a plurality of edge areas with the ridge of edge strength as a boundary. To be more specific, an edge strength image having the edge strength of each pixel as a pixel value is created to acquire a gradient direction of the edge strengths of the pixels in the edge strength image. The gradient direction at this time is the direction in which the edge strength value decreases. Next, the minimal-value pixel reached from each pixel moving along the gradient direction is searched, and the image is divided such that pixels of the starting points having reached adjacent pixels of the minimal value are included in the same area (reference: WO 2006/080239).

In addition, as an image division method, it is possible to adopt a known method such as a watershed algorithm (reference: Luc Vincent and Pierre Soille, "Watersheds in Digital Spaces: An Efficient Algorithm Based on Immersion Simulations", IEEE Transactions on Pattern Analysis and Machine Intelligence, Vol. 13, No. 6, pp. 583-598, June 1991).

According to a fourth embodiment, a distribution profile of feature data based on the feature data per area formed with a plurality of pixels is acquired, and therefore it is possible to create decision and discriminant criteria of reliability reflecting the feature of each area and improve the calculation speed.

Fifth Embodiment

In the first to third embodiments, although a straight line model or curve line model approximating a distribution profile is calculated by fitting a straight line or curve line to the distribution profile of feature data, other kinds of graphics may be used to perform the fitting. For example, in the case of approximating a distribution profile of feature data in a two-dimensional feature space having two kinds of feature data as elements, it may be possible to fit graphics such as a circle, ellipse, triangle and quadrangle. In the case of approximating a distribution profile of feature data by these graphics, as an intra-feature-space distance, for example, a distance between a point representing feature data and a circumference of a model may be calculated.

Sixth Embodiment

In the first to third embodiments, as a specific example, although two kinds of feature data (i.e. values of the R component and the G component) are used to perform calculation processing, three or more kinds of feature data may be used. In this case, as a graphic used for fitting, in addition to a straight line and a curve line, it is possible to use a two-dimensional graphic and a three-dimensional graphic (e.g. sphere or cylinder).

As described above, according to the above first to sixth embodiments and modifications, an abnormal area is detected based on an approximate shape approximating a distribution area profile of feature data in a feature space having the feature data of each pixel or each area in an image as elements, and therefore it is possible to stably detect an abnormal area regardless of the size of the abnormal area included in the image.

The image processing device according to the above first to sixth embodiments and modifications can be implemented by causing a computer system such as a personal computer and workstation to execute an image processing program recorded in a recording medium. Also, it may be possible to use such a computer system after being connected to a device such as other computer systems and servers via a local area network (LAN), a wide area network (WAN) or a public line such as the Internet. In this case, the image processing device according to the first to sixth embodiments and modifications may be configured to acquire image data of an intraluminal image via these networks, output an image processing result to various output devices (such as a viewer and printer) connected via these networks and store an image processing result in a recording device (such as a recording medium and its reading device) connected via these networks.

The present invention is not limited to the first to sixth embodiments and their modifications. Various inventions may be made by combining components disclosed in each embodiment or modified example as appropriate. For example, an invention may be made by using all the components disclosed in each embodiment or modified example from which some of the components are excluded or may be made by combining the components disclosed in the different embodiments and modified examples as appropriate.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing device comprising:
   a feature data calculator configured to calculate feature data of each pixel in an image or each area acquired by dividing the image into a plurality of areas;
   an approximate shape calculator configured to calculate an approximate shape approximating a profile of a distribution area in which the feature data is distributed in a feature space having the feature data as an element; and
   an abnormal area detector configured to detect an abnormal area in the image based on the approximate shape and the profile of the distribution area,
   wherein the approximate shape calculator comprises a graphic fitting unit configured to fit a geometric graphic to the profile of the distribution area, and uses a graphic fitted by the graphic fitting unit as the approximate shape.

2. The image processing device according to claim 1, wherein:
   the feature data calculator calculates two or more kinds of feature data; and
   the feature space is a two-or-more-dimensional space having the two or more kinds of feature data as an element.

3. The image processing device according to claim 2, wherein:
   the image is an intraluminal image; and
   the feature data calculator calculates two or more wavelength components of different absorption/scattering levels in a living body, as feature data.

4. The image processing device according to claim 1, wherein the graphic fitting unit comprises a straight line fitting unit configured to fit a straight line to the profile of the distribution area.

5. The image processing device according to claim 1, wherein the graphic fitting unit comprises a curve line fitting unit configured to fit a curve line to the profile of the distribution area.

6. The image processing device according to claim 1, wherein the graphic fitting unit comprises a fitting result selector configured to select a result of a highest fitting accuracy from results of fitting a plurality of the geometric graphics.

7. The image processing device according to claim 1, wherein the approximate shape calculator comprises a robust estimation unit configured to estimate the approximate shape excluding an outlier in a distribution of the feature data, and calculates the approximate shape based on an estimation result in the robust estimation unit.

8. The image processing device according to claim 7, wherein the robust estimation unit comprises a repeat estimation unit configured to recursively repeat an estimation of the approximate shape and an outlier removal based on the estimation result.

9. The image processing device according to claim 7, wherein the robust estimation unit comprises a best-estimation search unit configured to extract a plurality of different items of sampling data from the distribution of the feature data and search an estimation result of a highest estimation accuracy from a plurality of estimation results estimated based on the plurality of items of sampling data.

10. The image processing device according to claim 1, wherein the abnormal area detector comprises an intra-feature-space distance calculator configured to calculate an intra-feature-space distance between the feature data of each pixel or each area in the image and the approximate shape, and detects an abnormal area based on the intra-feature-space distance.

11. The image processing device according to claim 10, wherein the abnormal area detector further comprises an outlier detector configured to detect an outlier in a distribution of the intra-feature-space distance, and detects an abnormal area based on a detection result in the outlier detector.

12. The image processing device according to claim 10, wherein the abnormal area detector further comprises an area connector configured to detect predetermined pixels or areas based on the intra-feature-space distance and connect the detected pixels or areas in the image, and detects an abnormal area based on the feature data in a connection area connected by the area connector.

13. The image processing device according to claim 1, further comprising an examination area identifying unit configured to identify an examination area in the image,
   wherein the approximate shape calculator calculates the approximate shape using the feature data in the examination area.

14. The image processing device according to claim 13, wherein:
   the examination area identifying unit comprises:
      a clustering unit configured to divide a distribution of feature data in the image into clusters; and
      a cluster identifying unit configured to identify a cluster including feature data of the examination area; and
   the examination area is identified based on an identification result of the cluster in the cluster identifying unit.

15. An image processing method comprising:
   calculating feature data of each pixel in an image or each area acquired by dividing the image into a plurality of areas;
   calculating an approximate shape approximating a profile of a distribution area in which the feature data is distributed in a feature space having the feature data as an element; and
   detecting an abnormal area in the image based on the approximate shape and the profile of the distribution area,
   wherein the step of calculating the approximate shape comprises fitting a geometric graphic to the profile of the distribution area, and using the fitted geometric graphic as the approximate shape.

16. A computer readable recording device with an executable program stored thereon, wherein the program instructs a processor to perform:
- calculating feature data of each pixel in an image or each area acquired by dividing the image into a plurality of areas;
- calculating an approximate shape approximating a profile of a distribution area in which the feature data is distributed in a feature space having the feature data as an element; and
- detecting an abnormal area in the image based on the approximate shape and the profile of the distribution area,
- wherein performance of calculating the approximate shape comprises fitting a geometric graphic to the profile of the distribution area, and using the fitted geometric graphic as the approximate shape.

* * * * *